R. B. FAGEOL.
SUPPORT FOR BUMPER BARS.
APPLICATION FILED NOV. 27, 1915.
1,207,007.
Patented Dec. 5, 1916.
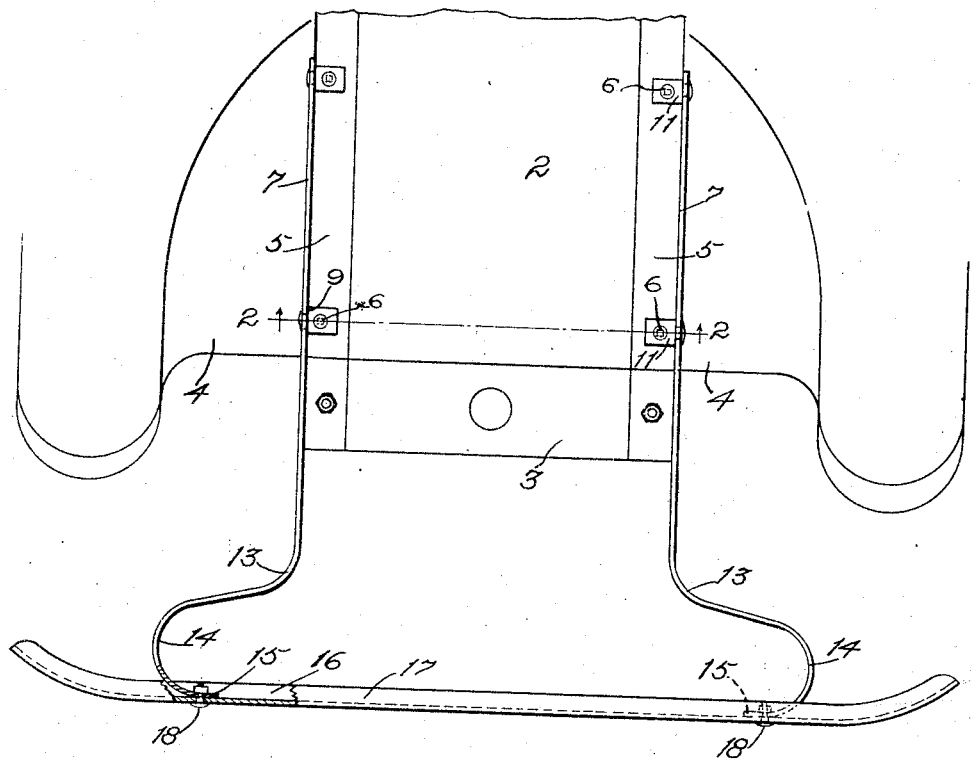
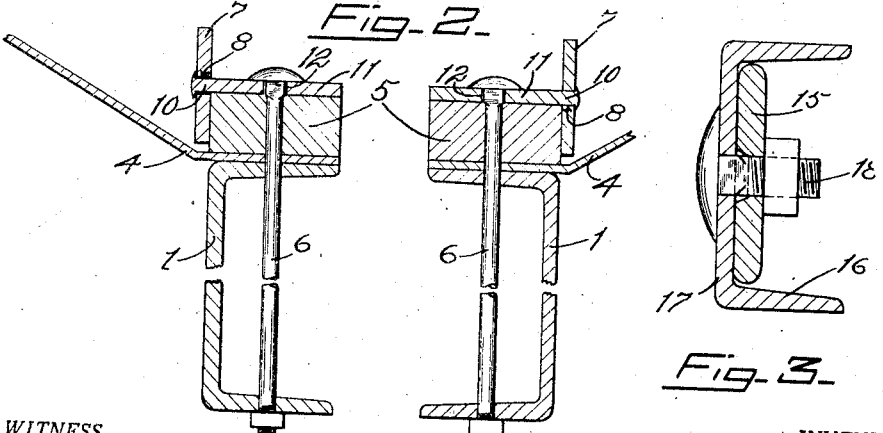

UNITED STATES PATENT OFFICE.

ROLLIE B. FAGEOL, OF OAKLAND, CALIFORNIA.

SUPPORT FOR BUMPER-BARS.

1,207,007.

Specification of Letters Patent.

Patented Dec. 5, 1916.

Application filed November 27, 1915. Serial No. 63,727.

*To all whom it may concern:*

Be it known that I, ROLLIE B. FAGEOL, a citizen of the United States, residing at Oakland, in the county of Alameda and State of California, have invented certain new and useful Improvements in Supports for Bumper-Bars, of which the following is a specification.

The present invention relates to improvements in bumper bars for motor vehicles, and has for its principal objects to provide a spring bumper bar mounting which is capable of being secured to or mounted at either side of the vehicle to support either end of the bar, thereby dispensing with the necessity of two forms of support, one for each side of the vehicle; to provide a bumper particularly designed for cars of the Ford type and which is adapted for bolting to the frame thereof without the necessity of drilling any additional holes in the frame than those originally provided, thereby providing a structure which is capable of being easily applied without the aid of a skilled mechanic.

Further objects are to provide a bumper support wherein the curved ends thereof are received in the channel groove of the bumper, thereby rigidly supporting the same and wherein the bumper and supporting arms may be easily and quickly separated should repairs be necessary.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a top plan view of a vehicle with an embodiment of my bumper secured thereto. Fig. 2 is a transverse sectional view taken on line 2—2 of Fig. 1. Fig. 3 is a transverse sectional view of the bumper illustrating the channel therein.

Referring more particularly to the drawings, wherein like characters of reference designate corresponding parts throughout the several views,—1 indicates the side members of the vehicle frame, 2 the hood, 3 the radiator, 4 the fender aprons and 5 the hood ledges resting on the fender aprons and between which and the side frame members the fender aprons are clamped. The hood ledges 5 are normally secured in position by bolts 6 passing through the same, the fender aprons 4 and the side frame members 1.

The present bumper support comprises a member, preferably of flat or strap material having the straight base portion 7 which is formed centrally of its face with transversely extending oval shaped cut out portions 8, the longitudinal axes of which are parallel with the base, and said openings are spaced a distance equal to the distance between the bolts 6. Extending through said openings, with the shoulders 9 thereof abutting against the face of the base, are the shanks 10 of flat lugs 11 which project outwardly from one side of the base and are provided with suitable openings 12, each adapted to receive a bolt 6 when the support is secured in position on the frame. The ends of the shanks are beaten down or flattened to secure the same in position in the base.

The outer portion of the support is preferably tempered and is bent or bowed outwardly, as at 13, in a direction away from said lugs, and is then bent or curved backwardly on itself, as at 14, providing a supporting end portion 15 which is disposed at an approximate right angle to the line of the base portion. The supporting end portion is provided with a bolt receiving opening.

By constructing the support as above described, the same is interchangeable and capable of being used at either side of the vehicle frame, thus necessitating the construction of but one type of support. By inserting the lugs 11 in the base intermediate its side edges, a flange is provided which overhangs the longitudinal side edge of the hood ledge and provides a brace for the support. In use one of said supports is positioned at each side of the vehicle frame and is secured thereto by passing the hood ledge bolts 6 through the openings 12 in the lugs 11. The outer supporting end portions 15 of said supports are received in the channel 16 of a suitable bumper bar 17 which extends transversely of the vehicle frame, and said bumper bar is secured to said supporting end portions by the bolts 18, one extending through the bolt receiving opening in each supporting end and through the bumper bar. The channel 16 of the bumper bar is of a width approximately the same as that of the support, and the outer ends 16 of said supports extending longitudinally within said channel provide a rigid mounting for the same.

It will be apparent that I have provided a bumper which is designed especially for a certain type of vehicle and is capable of being secured thereto without altering the vehicle and by certain of the same bolts originally employed in the manufacture of the vehicle and used in their original places. I have also provided a spring supporting arm which is interchangeable for attachment to either longitudinal side edge of the vehicle frame.

Having thus described my invention, what I claim as new and desire to protect by Letters Patent is:—

1. A support for vehicle bumper bars capable of reversing for attachment to either side of a vehicle frame, comprising a substantially flat bar, the base portion of which is adapted for lying in a plane parallel with the outer side face of the vehicle side frame member, a lug extending at right angles from one face of the base member intermediate of the side edges thereof and adapted for projecting inwardly over the main body portion of the vehicle side frame member to provide a support for the base portion of said bar.

2. A support for vehicle bumper bars capable of reversing for attachment to either side of a vehicle frame, comprising a substantially flat bar, the base portion of which is adapted for lying in a plane parallel with the outer side face of the vehicle side frame member, a lug extending at right angles from one face of the base member intermediate of the side edges thereof with its side faces in parallel spaced relation to the longitudinal side edges of said base portion, and adapted for projecting inwardly over the main body portion of the vehicle side frame member to provide a support for the base portion of said bar.

3. A support for vehicle bumper bars capable of reversing for attachment to either side of a vehicle frame, comprising a substantially flat bar, a portion of which is adapted for extending parallel with the outer side face of the vehicle side frame member, said bar being substantially T-shape in cross section at certain portions, providing a web projecting inwardly and adapted to overlie the vehicle side frame member to provide a support for said bar.

4. A support for vehicle bumper bars capable of attachment to either side of a vehicle frame, comprising a flat bar of spring metal adapted for a portion of its length to lie in a plane parallel to and in contact with the outer side face of a vehicle side frame member, and provided on one face with a laterally extending portion adapted when the support is positioned in coöperative relation with either vehicle side frame member for projecting inwardly beyond the side face of the vehicle side frame member to provide a support for said bar.

5. As an article of manufacture, an integral, reversible, yielding support for attachment of a bumper bar to a vehicle frame, comprising a bar having an angularly disposed forward extension member, its terminal adapted to lie in a plane parallel with the inner face of a bumper bar, and said bar provided with a rearward extension adapted for a portion of its length to lie in a plane parallel with the face of a vehicle side member and such portion of the bar formed with a laterally extended member adapted to project inwardly beyond the side of the vehicle side member to provide a support for said bar relative thereto.

6. An integral, reversible, yieldable support for uniting a bumper bar to a vehicle frame, the same comprising a curved yieldable head member portion adapted for union to a bumper bar, said member terminating in a rearward longitudinal extension adapted to lie for a portion of its length parallel to the face of the side member of a vehicle frame, said longitudinal extension being formed with an inwardly projecting support adapted to overlie the side member of a vehicle frame for uniting the same thereto.

In testimony whereof I have signed my name to this specification in the presence of two subscribing witnesses.

ROLLIE B. FAGEOL.

Witnesses:
 HARRY A. TOTTEN,
 D. B. RICHARDS.